(12) United States Patent
Riddering et al.

(10) Patent No.: US 6,952,330 B1
(45) Date of Patent: Oct. 4, 2005

(54) DYNAMIC FLYING ATTITUDE CONTROL USING AUGMENTED GIMBAL

(75) Inventors: Jason Wayne Riddering, Prior Lake, MN (US); Markus Erwin Mangold, Eden Prairie, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 395 days.

(21) Appl. No.: 09/590,436

(22) Filed: Jun. 9, 2000

Related U.S. Application Data
(60) Provisional application No. 60/138,691, filed on Jun. 11, 1999.

(51) Int. Cl.[7] .............................................. G11B 21/21
(52) U.S. Cl. ................................ 360/294.7; 360/245.3
(58) Field of Search .......................... 360/294.4, 294.3, 360/294.7, 245.3, 246.7, 264.5

(56) References Cited

U.S. PATENT DOCUMENTS

| | | | | |
|---|---|---|---|---|
| 4,374,402 A | * | 2/1983 | Blessom et al. | 360/266.2 |
| 4,651,242 A | * | 3/1987 | Hirano et al. | 360/254.3 |
| 4,814,908 A | * | 3/1989 | Schmitz | 310/306 |
| 4,954,904 A | * | 9/1990 | Goor | 360/294.7 |
| 5,153,785 A | * | 10/1992 | Muranushi et al. | 360/294.7 |
| 5,282,190 A | * | 1/1994 | Maruo et al. | 369/300 |
| 5,313,352 A | * | 5/1994 | Chikazawa et al. | 360/294.7 |
| 5,475,318 A | * | 12/1995 | Marcus et al. | 219/543 |
| 5,477,404 A | * | 12/1995 | Kozaki | 360/294.7 |
| 5,754,355 A | * | 5/1998 | Nakamura et al. | 360/53 |
| 5,856,896 A | * | 1/1999 | Berg et al. | 360/245.3 |
| 5,943,189 A | * | 8/1999 | Boutaghou et al. | 360/234.7 |
| 5,991,114 A | * | 11/1999 | Huang et al. | 360/254.3 |
| 6,038,104 A | * | 3/2000 | Sato et al. | 360/294.3 |
| 6,069,771 A | * | 5/2000 | Boutaghou et al. | 360/294.4 |
| 6,118,637 A | * | 9/2000 | Wright et al. | 360/245.3 |
| 6,178,157 B1 | * | 1/2001 | Berg et al. | 360/294.7 |
| 6,181,531 B1 | * | 1/2001 | Koshikawa et al. | 360/294.4 |
| 6,201,668 B1 | * | 3/2001 | Murphy | 360/294.4 |
| 6,239,952 B1 | * | 5/2001 | Bonin | 360/294.4 |
| 6,246,552 B1 | * | 6/2001 | Soeno et al. | 360/294.4 |
| 6,297,936 B1 | * | 10/2001 | Kant et al. | 360/294.4 |
| 6,310,750 B1 | * | 10/2001 | Hawwa et al. | 360/294.4 |
| 6,320,730 B1 | * | 11/2001 | Stefansky et al. | 360/294.4 |
| 6,327,120 B1 | * | 12/2001 | Koganezawa et al. | 310/311 |
| 6,335,848 B1 | * | 1/2002 | Mei | 360/294.4 |
| 6,351,354 B1 | * | 2/2002 | Bonin | 360/245.9 |
| 6,765,765 B2 | | 7/2004 | Bement et al. | 369/294.3 |
| 2001/0046108 A1 | * | 11/2001 | Lewis et al. | 360/294.7 |

FOREIGN PATENT DOCUMENTS

| | | | |
|---|---|---|---|
| JP | 3-97174 | * | 4/1991 |
| JP | 5-347078 | * | 12/1993 |
| JP | 7-296537 | * | 11/1995 |
| JP | 08-30947 | * | 2/1996 |
| JP | 10-34924 | * | 2/1998 |
| JP | 10-69747 | * | 3/1998 |

* cited by examiner

*Primary Examiner*—Brian E. Miller
(74) *Attorney, Agent, or Firm*—Westman, Champlin & Kelly P.A.

(57) ABSTRACT

A head suspension mounts a head assembly in a disc drive. The head suspension includes controllable bending elements on the gimbal portion of the head suspension which allow dynamic control of the flying attitude of the head assemblies, and thus the flying height. In a first embodiment, the control elements are bi-metal features that utilize differential thermal expansion to control the flying attitude. In a second, and presently preferred, embodiment, the control elements are piezo-electric elements which provide bi-directional control of associated elements of the gimbal portion of the head suspension. In another aspect, the controllable bending elements are used to increase the flying height of the head assembly as the head assembly is moved from the data recording area of the disc into engagement with a textured landing zone.

18 Claims, 11 Drawing Sheets

DYNAMIC FLYING ATTITUDE CONTROL USING AUGMENTED GIMBAL

CROSS REFERENCE TO RELATED APPLICATION

This application claims the benefit of U.S. Provisional Application Ser. No. 60/138,691, filed Jun. 11, 1999.

BACKGROUND OF THE INVENTION

This application relates generally to the field of rigid magnetic disc drive data storage devices, and more particularly, but not by way of limitation, to a head suspension for mounting and supporting a head assembly in a disc drive, and for providing dynamic control of the flying attitude of the head assembly.

Disc drives of the type known as "Winchester" disc drives or rigid disc drives are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 15,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

As the physical size of disc drives has decreased historically, the physical size of many of the disc drive components has also decreased to accommodate this size reduction. Similarly, the density of the data recorded on the magnetic media has been greatly increased. In order to accomplish this increase in data density, significant improvements in both the recording heads and recording media have been made.

For instance, the first rigid disc drives used in personal computers had a data capacity of only 10 megabytes, and were in the format commonly referred to in the industry as the "full height, 5¼" format. Disc drives of the current generation typically have a data capacity of over a gigabyte (and frequently several gigabytes) in a 3½" package which is only one fourth the size of the full height, 5¼" format or less. Even smaller standard physical disc drive package formats, such as 2½" and 1.8", have been established. In order for these smaller envelope standards to gain market acceptance, even greater recording densities must be achieved.

The recording heads used in disc drives have evolved from monolithic inductive heads to composite inductive heads (without and with metal-in-gap technology) to thin-film heads fabricated using semi-conductor deposition techniques to the current generation of thin-film heads incorporating inductive write and magneto-resistive (MR) read elements. This technology path was necessitated by the need to continuously reduce the size of the gap in the head used to record and recover data, since such a gap size reduction—and an associated reduction in write current—was needed to reduce the size of the individual bit domain and allow greater recording density.

Since the reduction in gap size and write current also meant that the head had to be closer to the recording medium, the quest for increased data density also lead to a parallel evolution in the technology of the recording medium. The earliest Winchester disc drives included discs coated with "particulate" recording layers. That is, small particles of ferrous oxide were suspended in a non-magnetic adhesive and applied to the disc substrate. With such discs, the size of the magnetic domain required to record a flux transition was clearly limited by the average size of the oxide particles and how closely these oxide particles were spaced within the adhesive matrix. The smoothness and flatness of the disc surface was also similarly limited. However, since the size of contemporary head gaps allowed data recording and retrieval with a head flying height of twelve microinches (0.000012 inches, $12\mu$") or greater, the surface characteristics of the discs were adequate for the times.

Disc drives of the current generation incorporate heads that fly at nominal heights of only about $1.0\mu$", and products currently under development will reduce this flying height to $0.5\mu$" or less. Obviously, with nominal flying heights in this range, the surface characteristics of the disc medium must be much more closely controlled than was the case only a short time ago.

It is common in the industry to move the head assemblies to designated park location when the disc drive experiences a loss of power. In a first class of disc drive, this park location is associated with ramp structures adjacent the outer diameters of the discs, and the head assembles are "parked" on the ramp structures, out of contact with the discs. Such disc drives are capable of withstanding large amounts of applied mechanical shock, and are frequently used, therefore, with laptop computer systems.

A second class of discs drives, often referred to as "contact start/stop" or CSS drives, park the head assemblies at a designated "landing zone" near the inner diameters of the discs, where user data is not stored.

As the surfaces of the discs has become progressively smoother—in order to increase areal recording density, as noted above—it has become problematic to park the heads on the disc surface due to increased static friction, or "stiction", between the extremely smooth air bearing surfaces of the head assemblies and the extremely smooth disc surfaces.

It has, therefore, become a common practice in the industry to provide a textured surface in the landing zones of the discs. Early examples of texturing in landing zones were created using mechanical abrading techniques, but as dictated by the flying heights necessary for current recording densities, most current generation landing zone texturing is produced using lasers, which apply a multitude of "bumps" with controlled size and spacing in the landing zones.

Once again, as the data recording zones of the discs became smoother and smoother, it was necessary to reduce the "roughness" of the landing zones, in order to enable the head assemblies to fly into the landing zones, and reducing the roughness of the landing zone has lead back to the problems of stiction which the textured surfaces of the landing zones were intended to alleviate.

It would be desirable, therefore, to be able to fly the head assemblies at low levels over the data recording areas of the disc, and dynamically alter the flying height to a greater level when it becomes necessary to park the heads, in order to allow the landing zones to continue to have a greater degree of texturing.

It should also be noted that a second approach to minimize stiction involves fabrication of sliders for head assemblies that include textured contact surfaces. Such head assemblies do not require the addition of texturing in the designated landing zone, since the texturing is carried along with the head assembly itself. The present invention, however, is also useful with such head assemblies to compensate for radial position dependent variations in head flying height, as will be discussed in more detail hereinbelow.

It has also become a common practice in the industry to provide a plurality of data recording zones radially arranged across the disc, to increase the total data storage capacity of the disc drive. Such "zone bit recording" or "constant linear density recording" schemes allow data at the outer zones of the discs to be recorded at the same linear density as at the inner zones, in spite of differences in the linear velocity between the head assemblies and the discs in these areas.

However, the difference in linear velocity as the head assemblies are moved outward tends to cause the head assemblies to fly higher, reducing the effectiveness of the heads in recording and retrieving data.

Similarly, skew effects associated with the common rotary actuators described above also contribute to variation in head flying heights with radial position of the head assemblies over the discs.

It would also be desirable, therefore, to be able to dynamically control the flying attitude of the head assemblies—and thus the flying height—to allow the heads to fly higher at a relatively "rough" landing zone, and to compensate for flying height variations caused by differences in relative linear velocity and skew angles between the head assemblies and the discs.

The present invention is directed to providing a head suspension which includes features for dynamically controlling the flying attitude of the head assemblies, and thus controlling the flying height of the head assemblies.

SUMMARY OF THE INVENTION

The present invention is a head suspension for a head assembly in a disc drive. The head suspension includes controllable bending elements on the gimbal portion of the head suspension which allow dynamic control of the flying attitude of the head assemblies, and thus the flying height. In a first embodiment, the control elements are bi-metal features that utilize differential thermal expansion to control the flying attitude. In a second, and presently preferred, embodiment, the control elements are piezo-electric elements which provide bidirectional control of associated elements of the gimbal portion of the head suspension. In another aspect, the controllable bending elements are used to increase the flying height of the head assembly as the head assembly is moved from the data recording area of the disc into engagement with a textured landing zone.

The manner in which the present invention is implemented, as well as other features, benefits and advantages of the invention, can best be understood by a review of the following Detailed Description of the Invention, when read in conjunction with an examination of the accompanying drawings.

DETAILED DESCRIPTION OF THE INVENTION

Figure 1:
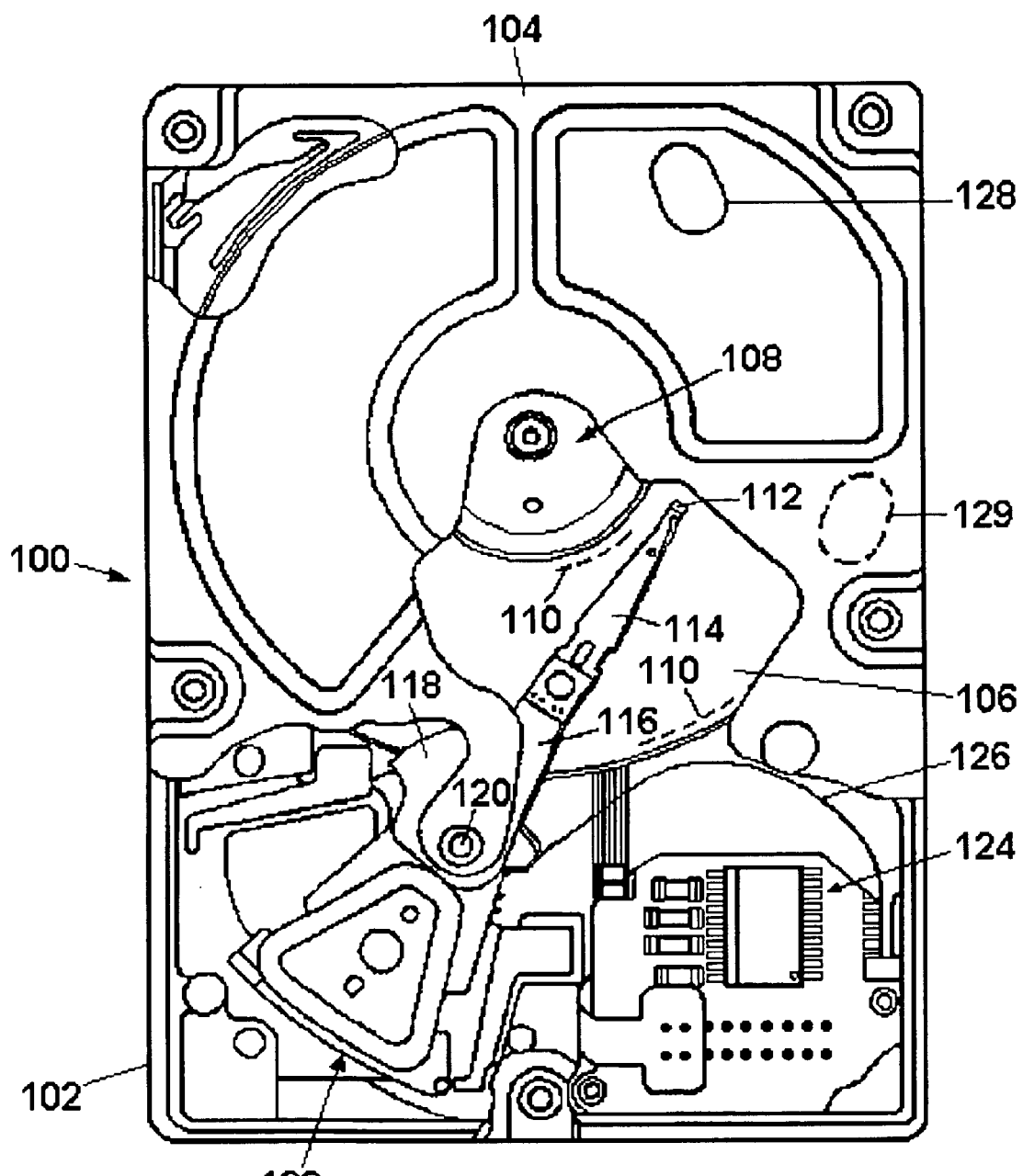
FIG. 1 is a top plan view of a disc drive with which the present invention is particularly useful.

Turning now to the drawings and specifically to FIG. 1, shown is a plan view of a disc drive 100 with which the present invention is particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes a plurality of discs 106 which are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112). The head assemblies 112 are supported by head suspensions, or flexures 114, which are attached to actuator head mounting arms 116. The actuator head mounting arms 116 are integral to an actuator bearing housing 118 which is mounted via an array of ball bearing assemblies (not designated) for rotation about a pivot shaft 120.

Power to drive the actuator bearing housing 118 in its rotation about the pivot shaft 120 is provided by a voice coil motor (VCM) shown generally at 122. The VCM 122 consists of a coil (not separately designated) which is supported by the actuator bearing housing 118 within the magnetic field of an array of permanent magnets (not separately designated) which are fixedly mounted to the base member 102, all in a manner well known in the industry. Electronic circuitry (partially shown at 124, generally, and partially carried on a printed circuit board (not shown)) to control all aspects of the operation of the disc drive 100 is provided, with control signals to drive the VCM 122, as well as data signals to and from the heads 112, carried between the electronic circuitry 124 and the moving actuator assembly via a flexible printed circuit cable. (PCC) 126.

Figure 2:
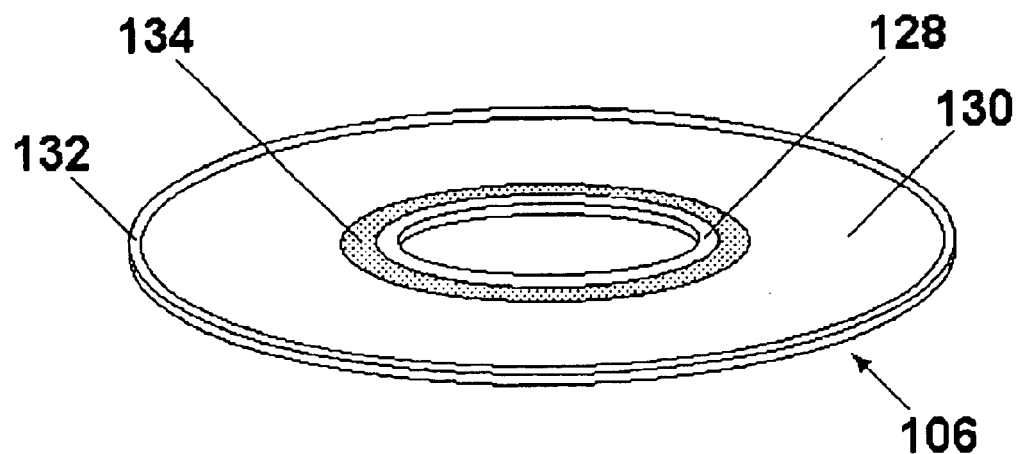
FIG. 2 is a perspective view of a prior art disc incorporating a textured landing zone.

FIG. 2 is a perspective view of a typical prior art disc 106. The disc 106 includes a disc clamping area 128 closely adjacent the inner diameter of the disc 106. This disc clamping area is occupied by disc spacers and a disc clamp (not shown) used to mount the disc 106 on a spindle motor, all in a manner well known in the industry.

FIG. 2 shows the user data recording area 130. This is the portion of the disc surface specifically available for recording user data.

The disc 106 also includes an outer guard band 132 near the outer diameter. The radial size of the outer guard band 132 is a function of the physical size of the associated head assembly, and is determined by how closely to the outer diameter of the disc the head assembly can reliably fly. User data is not recorded in the outer guard band 132.

Finally, FIG. 2 also shows that the disc 106 includes a textured landing zone 134 near the disc clamping area 128. The landing zone 134 is textured to minimize stiction between the disc 106 and an associated head assembly parked in contact with the disc 106, and is located at the inner portion of the disc 106 to minimize the torque required of the spindle motor when starting to rotate the disc 106 with a head resting thereon.

It will be apparent to those of skill in the art that it would be advantageous to maintain the landing zone 134 with a high relative roughness, while keeping the data area 130 extremely smooth, and to be able to control the flying height of the head assembly in a manner that allows the head assembly to fly extremely close to the disc surface in the data area 130, and at a greater flying height when the head assembly is moved to the landing zone 134.

Figure 3:
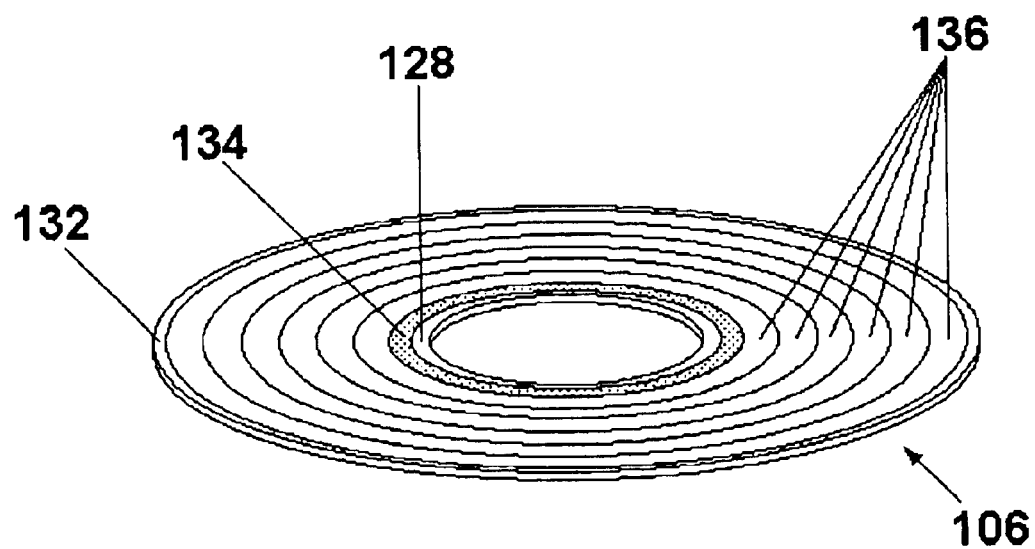
FIG. 3 is a perspective view of a prior art disc incorporating a textured landing zone and a plurality of data recording zones.

Turning now to FIG. 3, shown is a perspective view of another prior art disc 106. The disc 106 of FIG. 3 includes a disc clamping area 128, an outer guard band 132 and a textured landing zone 134, all similar to the prior art disc 106 of FIG. 2. However, in FIG. 3, the disc 106 can be seen to include a data recording area (not separately designated) that has been divided into a plurality of data zones 136. The radial widths of the data zones 136 are selected to maintain a substantially constant linear data density across the entire data recording area. That is, as the heads are moved radially outward across the disc, the relative linear velocity between the rotating disc and an associated head assembly increases, and the amount of data that can be recorded on a given track increases. As this amount of increase reaches the number of bytes assigned to a sector, an additional sector is added. Thus, each data zone includes a greater number of sectors than the zone immediately radially inward of it, and the overall data storage capacity of the disc drive can be increased when compared to disc drives that include the same number of sectors across the entire data recording area.

While the example disc 106 shown in FIG. 3 includes six data zones, the specific number of data zones will be dependent upon the actual disc drive implementation.

It is well known to those of skill in the art that the flying height of the head assembly is influenced by several factors, including the relative linear velocity between the rotating head and the disc, and the skew angle between the head assembly and the data track being accessed, as will be discussed in more detail below. It will also be evident to those of skill in the art that it would be desirable to be able to maintain a constant flying height across all the data zones 136, and thus optimize the data recording and retrieval characteristics of the disc drive.

Before proceeding with discussion of the present invention, it would be useful to further discuss several aspects of the prior art, and define various terms which will be utilized in subsequent discussions.

Figure 4:
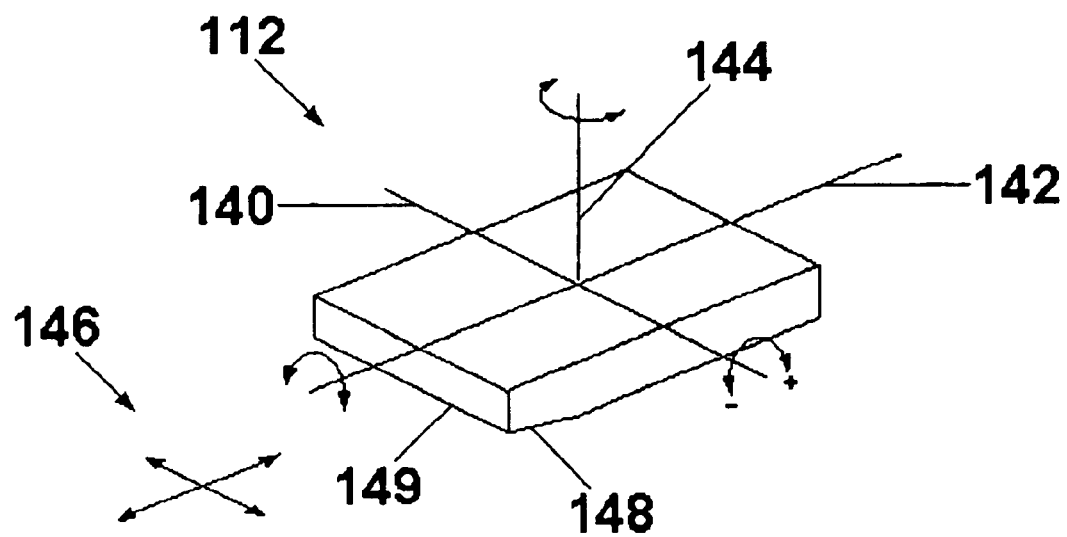
FIG. 4 is a perspective view of a head assembly used to define the various orthongonal axes used in subsequent discussion.

FIG. 4 is a perspective view of a typical head assembly 112, and is useful for defining the orthogonal axes that will be included in ensuing discussions.

FIG. 4 shows a pitch axis 140, a roll axis 142 and a yaw axis 144 about which the head assembly 112 can rotate, as well as in-plane axes 146, which are translational axes normal to the yaw axis 144.

A typical head suspension used to mount a head assembly 112 is expected to provide compliance in the pitch axis 140 and roll axis 142, while being non-compliant in the yaw axis 144 and in-plane axes 146. The compliance in the pitch and roll axes 140, 142 allows the head assembly 112 to follow minor variations in the surface of the disc above which the head assembly 112 is flying.

Variations in the pitch attitude and roll attitude of the head assembly 112 can, however, be expected to have effects on the flying height of the head assembly 112, and in particular on the flying height of the data transducer (not shown) carried by the head assembly 112.

FIG. 4 shows that the head assembly 112 includes a beveled portion 148 near its leading edge 149. This beveled portion 148 is useful in rapidly establishing the air bearing between the head assembly 112 and a rotating disc. It is also known that a more positive pitch attitude, as shown by the "+" sign on the pitch axis 140, i.e., a "nose-up" attitude results in higher flying heights, and a more negative pitch attitude causes lower flying heights. Similarly, since the transducer used to record and retrieve data on the disc surface is typically located on the trailing edge of the head assembly 112 near one or the other lateral sides of the head assembly, variations in roll attitude, i.e., about the roll axis 142, can change the proximity of the transducer to the disc surface, which is the effective flying height of the head assembly 112.

Figure 5:
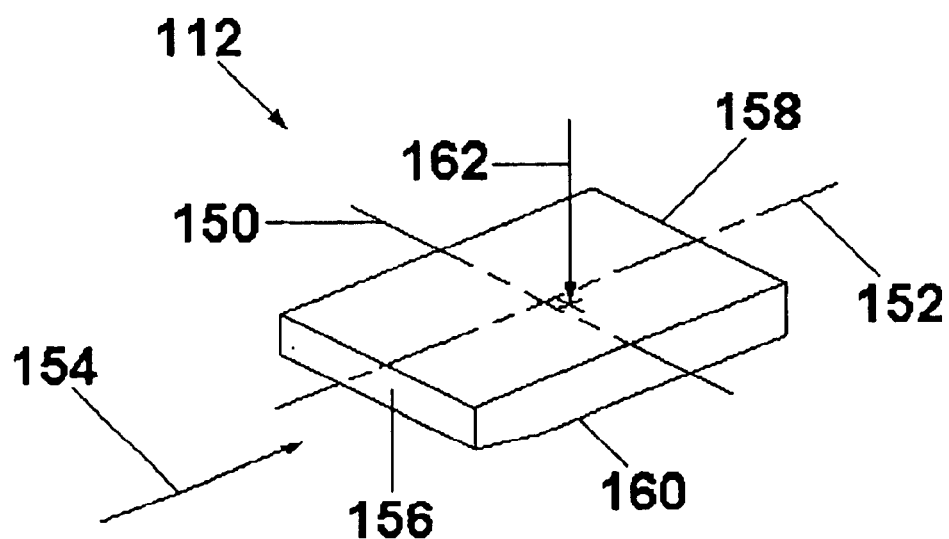
FIG. 5 is a perspective view of a head assembly showing prior art static attitude control mechanisms.

FIG. 5 shows another perspective view of the head assembly 112, with lateral and longitudinal centerlines 150, 152 identified. The direction of disc rotation relative to the head assembly 112 is shown by arrow 154, and the leading edge and trailing edge of the head assembly 112 are designated 156 and 158, respectively.

When the head assembly 112 is at any given radial location of the disc, it is well known that the linear velocity between the rotating disc and the head assembly is higher at the radially outer side of the head assembly, designated 160 in FIG. 5. In order, therefore, to balance the uneven hydrodynamic lifting forces on the inner and outer sides of the head assembly 112, and in order to facilitate formation of the air bearing between the head assembly 112 and the disc, it is common practice in the industry to fabricate the head suspension such that it applies a load force to the head assembly 112 at a position that is slightly outside the longitudinal centerline 152 and slightly behind the lateral centerline 150, as represented by the arrow 162. While such a positioning of the load force tends to balance the lifting forces applied to the head assembly 112 by the rotating disc, this is only a static compensation, and cannot be altered during the operation of the disc drive to compensate for differing hydrodynamic forces exerted on the head assembly 112 as it is moved from the inner portions of the disc to the outer portions.

It would also be desirable if the forces applied to the head assembly 112 could be controllably altered in accordance with the radial location of the head assembly on the disc, thus allowing the flying height to be dynamically controlled.

Before proceeding to discussion of the invention, it is perhaps beneficial to discuss the characteristics of prior art head suspensions.

Figure 6:
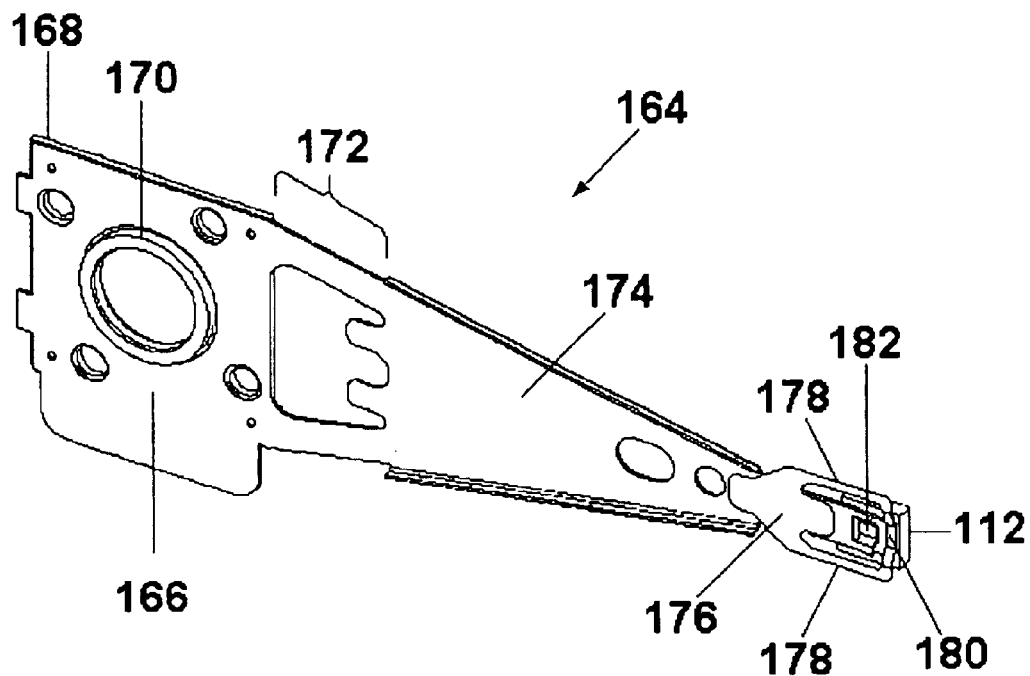
FIG. 6 is a perspective view of a prior art head suspension assembly and associated head assembly.

FIG. 6 is a perspective view of an example of a typical prior art head suspension 164 mounting a head assembly 112. The head suspension includes several functional portions: 1) a mounting portion 166 for attaching the head suspension 164 to an actuator (not shown). The mounting portion is commonly fixedly attached to and reinforced by a relatively robust mounting plate 168 which includes features, such as the swaging boss 170 for attaching the head suspension 164 to the actuator; 2) a spring portion 172, which serves to provide the load force to be applied to the head assembly 112; 3) a rigid beam portion 174 for transferring the load force generated by the spring portion 172 to the head assembly; and 4) a gimbal portion 176 to which the head assembly 112 is attached, and which provides, via a pair of laterally spaced gimbal beams 178, the aforementioned compliance in the pitch and roll axes of the head assembly 112. The attachment of the head assembly 112 is typically accomplished by an adhesive bond on a cross member 180 of the gimbal 176 near the trailing edge of the head assembly 112.

The load force generated by the spring portion 172 and transferred by the rigid beam portion 174 is applied to the head assembly 112 by point contact at a load point portion 182 of the rigid beam portion 174.

Those of skill in the art will be aware that the various elements of the head suspension can be formed of discrete elements fixedly attached to each other, or formed from a single integral piece of material.

Figure 7:
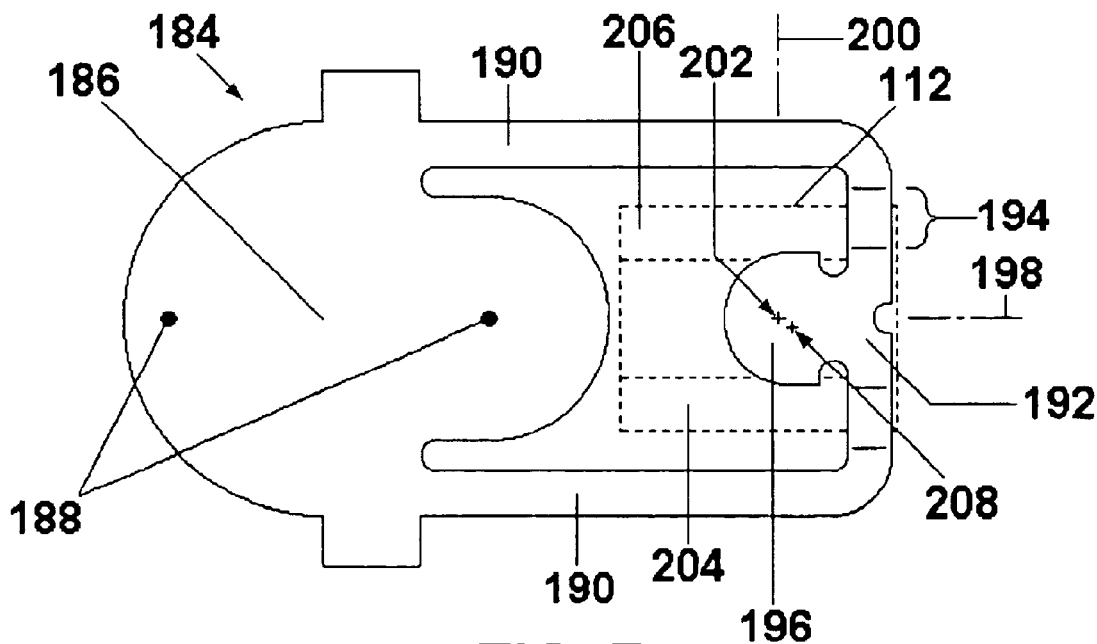
FIG. 7 is a top plan view of a typical prior art gimbal.

FIG. 7 is a plan view of another example of a typical gimbal 184. The gimbal 184 is of the type that is discretely fabricated, and then fixedly attached to the rigid beam portion (174 in FIG. 6) of a head suspension and includes a mounting portion 186 which can be connected to the rigid beam portion of the head suspension by, for instance, laser spot welds at 188. The gimbal 184 includes a pair of laterally spaced, longitudinally extending gimbal beams 190, which provide the necessary compliance in the pitch and roll axes of the head assembly, shown by dashed lines at 112.

The head assembly 112 is adhesively bonded to a cross member 192 that connects the distal ends of the gimbal beams 190. The cross member 192 also includes bend regions, one of which is identified at 194, which serve to displace the central portion of the cross member 192 out-of-plane from the mounting portion 186 and gimbal beams 190, in order to engage properly with the load point protrusion (not shown) of the rigid beam portion (174 in FIG. 6) of the head suspension, all in a manner well known in the art.

The gimbal 184 also includes a tongue portion 196, which extends proximally back from the cross member 192, and which is also typically adhesively bonded to the head assembly 112.

FIG. 7 also shows longitudinal and lateral centerlines 198, 200, respectively, which define the geometric center 202 of the head assembly 112. The head assembly 112 also includes outer and inner rails, 204 and 206, respectively, which interact with air dragged along by a rotating disc to form the air bearing between the head assembly 112 and the disc. As was previously mentioned, since the relative linear velocity of the rotating disc is greater under the outer rail 204 of the head assembly 112 than under the inner rail 206, there is a tendency for the outer rail 204 to fly higher than the inner rail 206. In order to compensate for this tendency, and to encourage the formation of the air bearing beneath the head assembly 112, it is common practice in the industry to apply the load force generated by the spring portion (172 in FIG. 6) of the head suspension at a point location 208, which is slightly offset toward the outer rail 204, and toward the trailing edge of the head assembly 112, as shown in the figure. One of skill in the art will appreciate, however, that such offsetting of the load force application point 208 is only a general compensation technique, since the difference between outer/inner rail linear velocity will change with the radial position of the head assembly 112 over the disc. Similarly, changes in skew angle of the head assembly 112 associated with rotary actuators also causes the forces acting on the head assembly 112 to vary with the radial position of the head assembly 112. Therefore, offsetting the location 208 at which the load force is applied is only a static correction, and cannot compensate for variations in forces exerted on the head assembly 112 during its movement across the disc surface.

Figure 8:
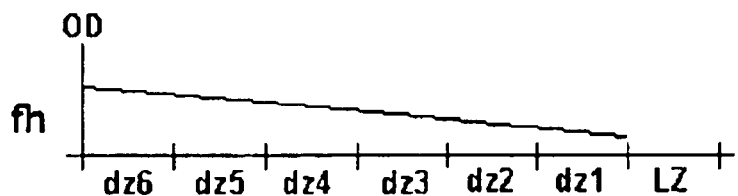
FIG. 8 is a graph showing the relationship between head assembly flying height and linear velocity differences caused by the radial position of the head assembly over the disc.
Figure 9:
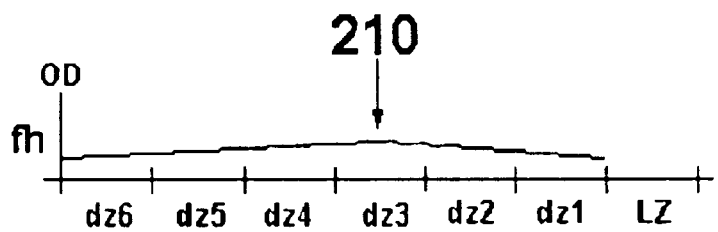
FIG. 9 is a graph showing the relationship between head assembly flying height and skew angle variations caused by the radial position of the head assembly over the disc.
Figure 10:
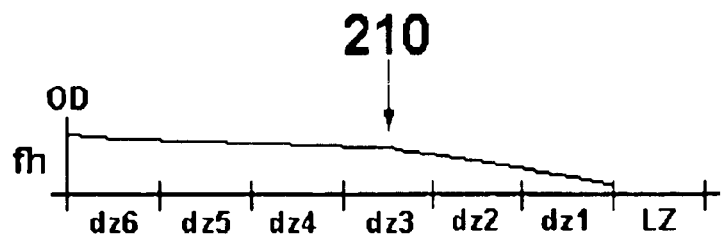
FIG. 10 is a graph showing the combined effects of linear velocity differences and skew angle variation on head assembly flying height.

FIGS. 8 through 10 are graphic representations showing, in general, the variations in flying height brought about by moving the head assembly radially across the disc.

Specifically, FIG. 8 shows the relationship between radial position and flying height caused by differences in relative linear velocity between a head assembly and a rotating disc.

In FIG. 8, the horizontal axis represents radial position of the head asssembly, with a landing zone, LZ, near the inner diameter of the disc, and a plurality of data zones, designated dz1–dz6 extending radially outward on the disc toward the outer diameter, OD. The vertical axis is representative of the flying height, fh, of the head assembly, can can be seen to increase in a substantially linear manner as the head is moved radially outward. This is because the relative linear velocity between the head assembly and the rotating disc increases as the head moves outward, increasing the magnitude of the hydrodynamic lifting force created at the air bearing surface. Since the load force applied by the head suspension to the head assembly is a constant value, the head assembly tends to fly higher near the OD.

FIG. 9 shows a graph similar to that of FIG. 8, representative of the relationship between skew angle of the head assembly and the portion of the disc passing beneath the head assembly. It is common practice in the industry, when utilizing a rotary actuator, such as that described in relationship to FIG. 1 above, to select a location substantially in the middle portion of the data recording region of the disc where the skew angle is zero, i.e., the longitudinal axis of the head assembly is substantially tangent to the data tracks passing beneath the head assembly. This point of zero skew is designated with arrow 210 in FIG. 9, and the graph shows that this is the point where the flying height, fh, would be greatest, if only the effects of skew angle are considered. This is because, at the point of zero skew 210, the air creating the air bearing is entering beneath the head assembly substantially directly in parallel with the air bearing surfaces of the head assembly, and thus creates the greatest possible lifting force.

As the head assembly is moved away from the point of zero skew 210, either inward toward the landing zone, LZ, or outward toward the OD, the air dragged along by the rotating disc tends to enter beneath the head assembly at increasingly greater angles to the air bearing surfaces, decreasing their efficiency, and the flying height, fh, also tends to decrease.

FIG. 10 is a graph representing the combined effects of linear velocity variation and skew angle changes, i.e., the combination of the graphs of FIGS. 8 and 9, and shows that flying height, increases at a first rate from near the landing zone, LZ, to the point of zero skew 210. The rate of flying height increase over this portion of the disc is thus a function of the sum of the increase in flying height due to linear velocity increase (from FIG. 8) and the increase in flying height due to decrease in skew angle, as reflected in FIG. 9.

From the point of zero skew 210 outward, the increasing linear velocity tends to drive the head higher, as shown in FIG. 8, while the increase in skew angle tends to bring the flying height downward, and the actual cumulative effect on flying height will be determined by the relative magnitudes of these two offsetting effects. Thus, while the example graph of FIG. 10 shows the flying height increasing slightly from the point of zero skew 210 to the OD, this would only be true if the effect of increased linear velocity is greater than the effect of increased head skew. If the two effects were equal, the flying height would remain constant over this portion of the disc, and if the effect of increased skew angle were greater than the effect of increasing linear velocity, the flying height would decrease as the head assembly is moved outward over this portion of the disc.

Whatever the cumulative effect of linear velocity and skew angle change in a particular disc drive, it is evident to those of skill in the art that the prior art head suspensions described above include no features for compensating for induced variations in flying height.

Similarly, the prior art head suspension described would also tend to bring the head assemblies to their closest approach to the disc surface near the LZ, as is shown in the graphs of FIGS. 8 through 10. It should be recalled, however, that the surface roughness of the textured landing zone is greater than that of the data zones, and it would, contrarily, be desirable to greatly increase the flying height at the LZ, in order to allow the permit the average roughness of the landing zone to be relatively greater, thus reducing stiction.

The head suspensions of the prior art obviously do not include any features for compensating for position-dependent flying height variation, nor do they include functional elements for increasing the flying height at the landing zone.

Before beginning a discussion of the specific implementation of the present invention, a short discussion of prior art technologies employed in the present invention is in order.

Figure 11:
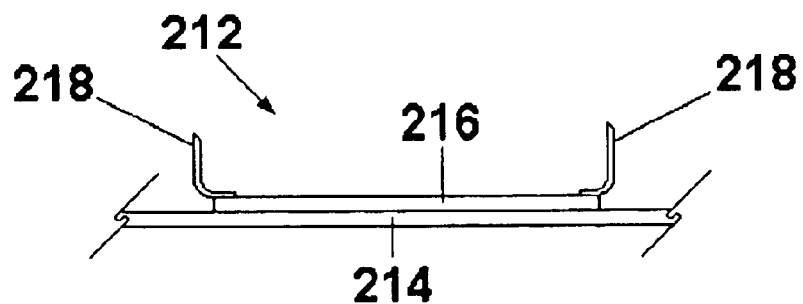
FIGS. 11 through 13 are simplified diagrammatic representations of bi-metal structures used to implement a first embodiment of the present invention.

Turning now to FIG. 11, shown is a simplified elevation view of a thermally activated bi-metal structure 212. The bi-metal structure 212 consists of a first material 214 and a second different material 216 bonded together. The critical difference between the two materials 214, 216 is their linear co-efficients of thermal expansion, $K_{TE}$, with the $K_{TE}$ of one of the materials being significantly greater or less than the $K_{TE}$ of the other material.

Figure 12:
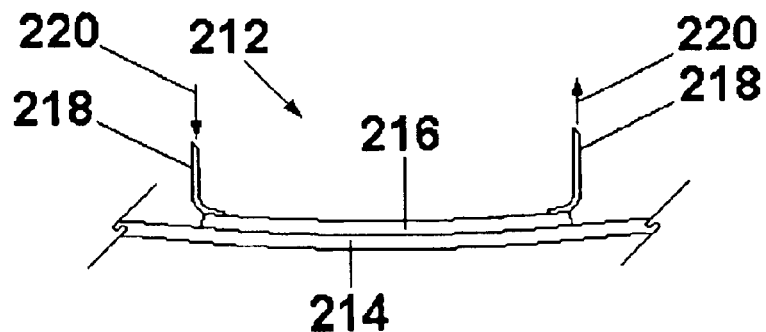
Figure 13:
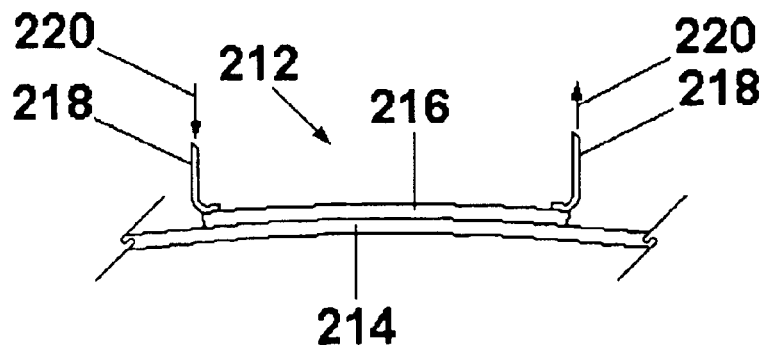

Electrical leads 218 are provided to the bi-metal structure, and the mechanical effect of passing current through the electrical leads 218 is shown in FIGS. 12 and 13.

In FIG. 12, it is assumed that the $K_{TE}$ of the first material 214 is greater than the $K_{TE}$ of the second material 216. When current is passed through the electrical leads 218, as represented by arrows 220, the two materials are heated, and the differences in the $K_{TE}$ of the two materials cause them to expand at different rates, with the first material 214 expanding to a greater extent than the second material 216. This causes the bi-metal structure 212 to bend upward, as shown in FIG. 12.

Conversely, if, as is illustrated in FIG. 13, the $K_{TE}$ of the second material 216 is greater than the $K_{TE}$ of the first material 214, passing current, as represented by arrows 220, through the electrical contacts 218 and heating the bi-metal structure 212 results in the second material 216 expanding to a greater extent than the first material 214, and the bi-metal structure 212 is bent downward.

One of skill in the art will recognize that the amount of bending due to heating of the bi-metal structure 212 will be dependent, in part, on the ratio of the $K_{TE}$ of the two materials, the relative thicknesses of the materials and the amount of electrical current—thus heating—applied to the structure.

It will also be evident that the direction of bending can be controlled by the orientation of the two materials to each other, as well as by the selection of the $K_{TE}$ of the materials. That is, the bi-metal structure 212 of FIG. 12 could be made to bend downward if the first and second materials 214, 216 were reversed, and the bi-metal structure 212 of FIG. 13 could be made to bend upward by a similar reversing of the relative locations of the materials 214, 216.

It will also be apparent to one of skill in the art that, since the bending effect is purely a thermal function, the polarity of the electrical current used to heat the bi-metal structure has no effect, and the direction of bending is solely dependent on the relationship between the $K_{TE}$ of the two materials, and the relative orientation of the materials.

While uni-directional thermally-induced bending of bi-metal structures for controlling the flying attitude and height of head assemblies will be discussed below, the presently preferred embodiment of the invention employs a second prior art technology which provides bi-directional bending of selected elements of a head suspension to control flying attitude and height.

Figure 14:
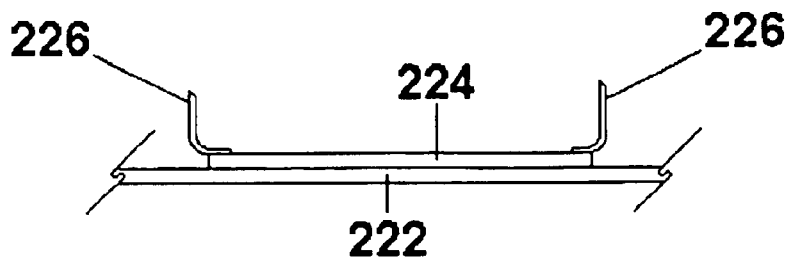
FIGS. 14 through 16 are simplified diagrammatic representations of a piezo-electric structure used to implement a second embodiment of the present invention.

FIG. 14 is a simplified elevation view showing a planar element 222 fixedly attached to which is a piezo-electric element 224. The planar element 222 is envisioned to be a resilient material, such as stainless steel. The piezo-electric element 224 includes electrical leads 226 at opposing ends thereof. The manner in which the piezo-electric element 224 can be used to bi-directionally bend the planar element 222 is illustrated in FIGS. 15 and 16.

Figure 15:
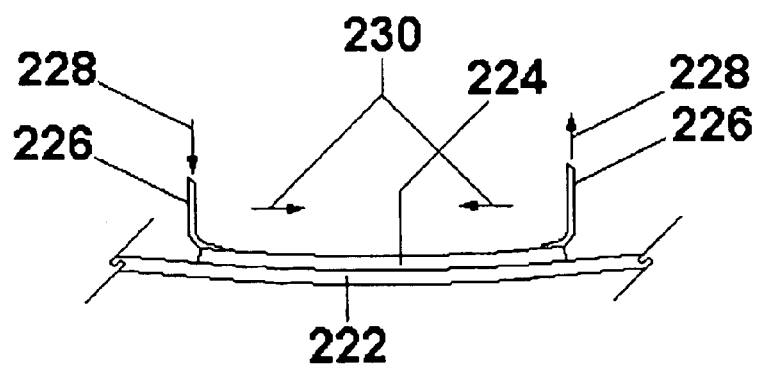

FIG. 15 shows that when electrical current is applied through the electrical leads 226 in a first polarity, as shown by arrows 228, the piezo-electric element 224 tends to contract, as shown by arrows 230. This contraction causes the planar element 222 to which the piezo-electric element 224 is attached to bend upward, as shown in the figure, much the same as the bi-metal structure 212 of FIG. 12 reacted to application of a heating current.

Figure 16:
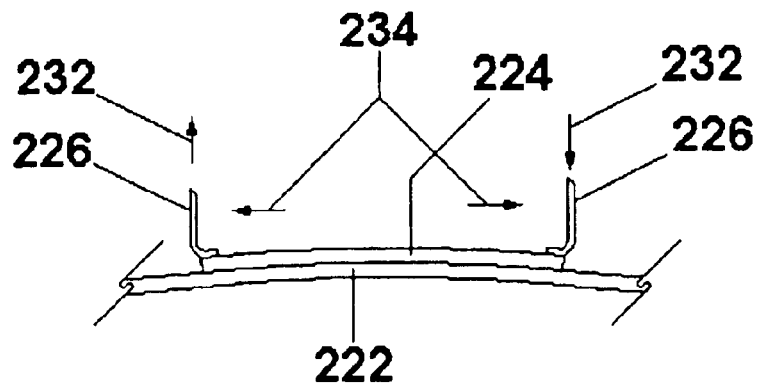

The advantages of the piezo-electric element 224 over the bi-metal structure of FIGS. 11 through 13 can be seen in FIG. 16.

FIG. 16 shows the same structure as FIGS. 14 and 15, and illustrates that when the polarity of the applied electrical current applied through the electrical leads 226 is reversed, as shown by arrows 232, the piezo-electric element 224 tends to expand, as shown by arrows 234. This expansion of the piezo-electric element 224 acts to bend the planar element 222 downward. Thus the combination of planar element 222 and piezo-electric element 224 can be bent in either of two directions—upward or downward—dependent upon the polarity of electrical current applied to the piezo-electric element 224. Furthermore, when no electrical current is applied to the piezo-electric element, the combination returns to the quiescent condition of FIG. 14.

One of skill the art will appreciate that the amount of bending of the planar element 222 will be dependent, in part, upon the material characteristics and dimensions of the piezo-element 224 and the magnitude of the current passed through the piezo-electric element 224, providing a versatile and controllable apparatus for bending the planar element 222 in either of two directions.

Now that the fundamental technologies involved in head suspensions and various mechanisms for controllably bending planar elements have been discussed, the manner in which the present invention is implemented can be described.

Figure 17:
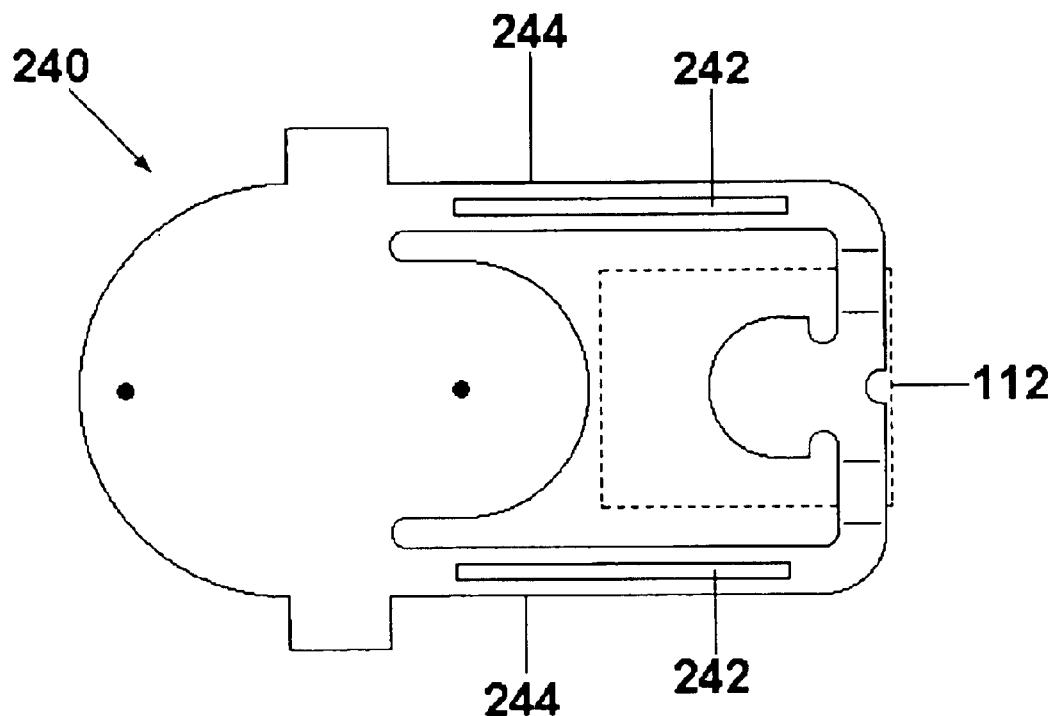
FIG. 17 is a plan view of a gimbal which has been modified in accordance with the present invention.

FIG. 17 is a plan view of a gimbal 240 which forms a portion of the head suspension of the present invention and has been modified in accordance with the present invention.

The gimbal 240 of FIG. 17 is similar to the prior art gimbal 184 of FIG. 7, but, as can be seen in FIG. 17, the gimbal 240 includes bending elements 242 extending along the lengths of the gimbal beams 244. The present invention envisions that these bending elements 242 can form, in combination with the material of the gimbal beams 244, either the bi-metal structure of FIGS. 11 through 13, or the piezo-electric/planar member structure shown by FIGS. 14 through 16.

A discussion of the manner in which the bending elements 242 can be utilized to control the structure of the gimbal 240—and thus the flying characteristics of an attached head assembly 112—will now be undertaken.

Figure 18:
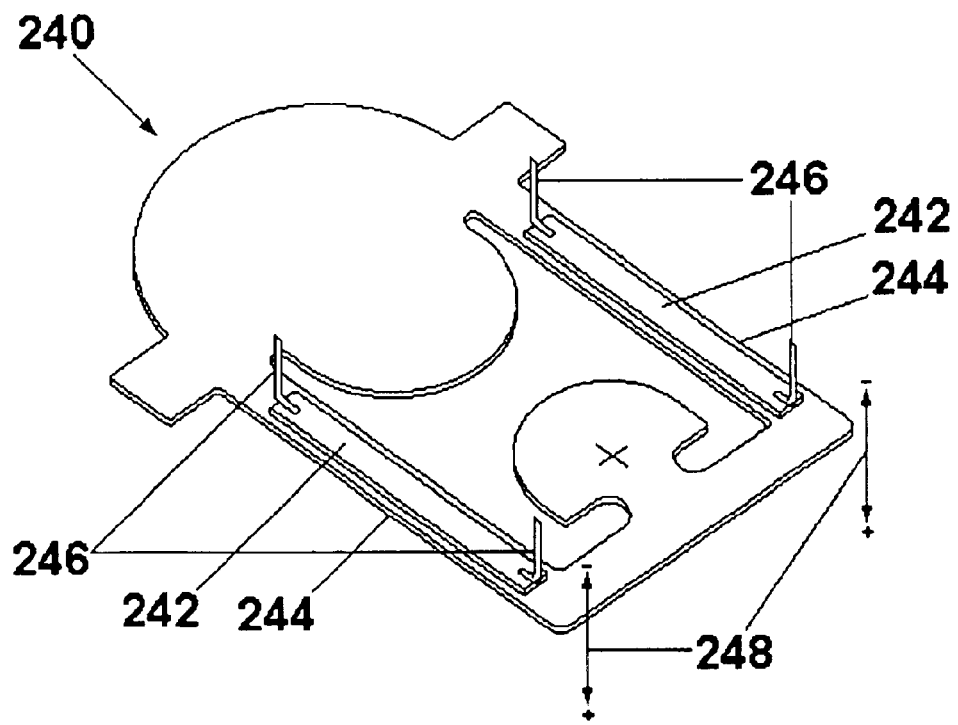
FIG. 18 is a perspective view of a gimbal which has been modified in accordance with the present invention.

Turning now to FIG. 18, shown is a perspective view of the gimbal 240 of FIG. 17. FIG. 18 also shows the electrical leads 246 via which electrical current can be applied to the bending elements 242.

It will be apparent to those of skill in the art that if the gimbal beams 244 can be controllably bent, the flying attitude of a head assembly attached to the gimbal 240—and thus its flying height—can also be controllably altered. Specifically, if the gimbal beams are bent downward—or in the direction of the "+" signs on arrows 248—additional load will be applied to the trailing edge of an attached head assembly, and the head assembly will assume a more positive pitch attitude, and tend to fly at a greater height. Similarly, if the gimbal beams 244 are bent upward, the attached head assembly will assume a more negative pitch attitude, and tend to fly at a lower height.

If the bending elements 242 are of the bi-metal type of FIG. 12, and the bending element 242 corresponds to the second material 216 in FIG. 12, then application of current through the electrical leads 248 will heat the bending elements 242 and gimbal beams 244, causing the gimbal beams 244 to bend upward, imparting increased negative pitch to the attached head assembly, causing the head assembly to fly lower.

Similarly, if the bending elements 242 are of the bi-metal type of FIG. 13, the gimbal beams 242 would both be bent downward, imparting increased positive pitch attitude to the attached head assembly, causing it to fly at a greater height.

Furthermore, if one of the bending elements 242 is of the type of FIG. 12, and the other bending element 242 is of the type of FIG. 13, then application of current will heat the bi-metal structures, causing one of the gimbal beams 244 to bend upward, while the other gimbal beam 244 bends downward, altering the roll attitude of the attached head assembly. The effect of altering the roll attitude on the flying height of the head assembly will be dependent upon which of the gimbal beams 244 is bent upward, and which is bent downward, and the location of the head assembly over the disc.

It will be apparent that, the use of bi-metal bending elements 242 can be expected to provide some degree of dynamic control over the flying attitude—and thus flying height—of the head assembly. However, since the bi-metal structures are capable of producing bending in only a single direction, complete dynamic control of the head assembly is not readily achieved using bi-metal bending elements 242.

The preferred embodiments of the present invention, therefore, envision that the bending elements 242 will be of the piezo-electric type described above with regard to FIGS. 14 through 16, as will be described below.

Returning now to FIG. 18, if the bending elements are of the piezo-electric type described in relationship to FIGS. 14 through 16 above, it is readily apparent that the bending elements 242 can be selectively driven to bend both gimbal beams 244 upward, or both gimbal beams 244 downward, or either of the gimbal beams 244 to be bent in a first direction, while the other is bent in the opposite direction. It will also be understood that the piezo-electric bending elements of FIGS. 14 through 16 can be utilized to selectively bend the gimbal beams 244 to varying degrees by controlling the amount of current applied through the bending elements 242. Thus, use of bi-directional piezo-electric bending elements 242 allows a high degree of dynamic control over both the pitch and roll attitudes of a head assembly attached to the gimbal 240.

Figure 19:
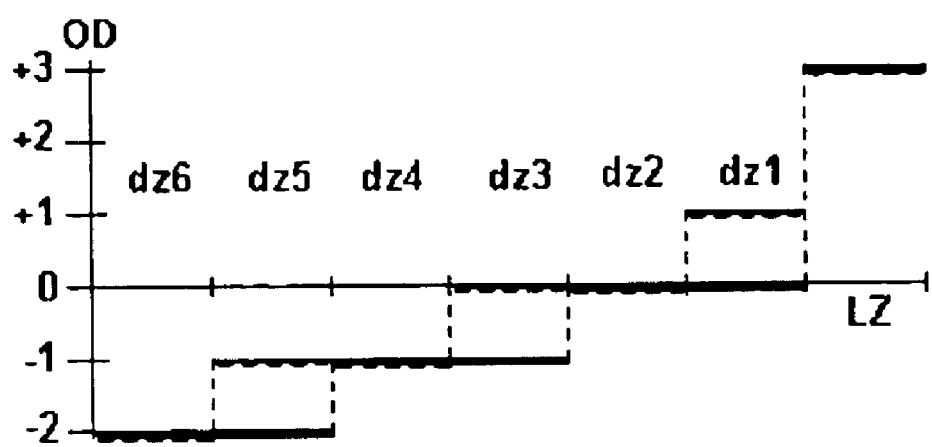
FIG. 19 is a graph showing an example of electrical signals which can be applied to the control elements of the head suspension of the present invention to control flying attitude of the head assembly.

An example of control signals that can be applied to the piezo-electric bending elements 242 is graphically illustrated in FIG. 19. It should be noted that this combination of applied signals is exemplary only, and not considered as limiting to the envisioned scope of the present invention.

Turning now to FIG. 19, the horizontal axis of the graph is representative of the radial location of a head assembly over a disc surface, with the landing zone, LZ, near the inner diameter of the disc on the right, and data zones, dz1 through dz6 plotted in ascending order toward the outer diameter, OD, of the disc on the left, similar to the previously described graphs of FIGS. 8 through 11.

The vertical axis of the graph of FIG. 19 represents the polarity and magnitude of electrical current applied to piezo-electric bending elements, such as the bending elements 242 of FIG. 18, with the zero vertical reference indicating that no current is applied to the bending element, positive values tending to bend the gimbal beams (244 in FIG. 18) downward, negative values tending to bend the gimbal beams upward, and the magnitude of the positive and negative signals reflective of the amount of bending induced in the gimbal beams.

Before continuing this description, it is perhaps best to recall that the example about to be discussed is a general example only. Thus, the number of data zones, the number of differing control signals for each polarity, and the relationship of switching control signals to data zones should, therefore, be considered as descriptive only, and not as an actual implementation of the present invention, or limiting to the scope of the invention.

In the example of FIG. 19, control current applied to the bending element associated with the outermost gimbal beam is indicated with a combination dashed and solid line, while control current applied to the bending element on the inner gimbal beam is shown with a heavy solid line.

As can be seen in the figure, when the head is positioned in the LZ, positive currents of the greatest magnitude (+3) are applied to both bending elements. This will result in a maximum positive pitch attitude, leading to the desired increased flying height in the textured LZ.

As the head moves into the first data zone, dz1, current is removed from the inner bending element, and only the smallest discrete positive current (+1) is applied through the outer bending element. Application of such currents applies downward force at the outer trailing edge of the attached head assembly, resulting in more than normal roll toward the outer diameter of the disc. Since, as illustrated in FIGS. 8 and 9, both the linear velocity and the skew angle in dz1 contribute to low flying height, introduction of such an additional roll moment on the head assembly would contribute to leveling the inner and outer edges of the head assembly, and tend to lift the head assembly further from the disc surface.

As the head assembly is moved radially outward into dz2, current is removed from both the bending elements. The example being described, therefore, assumes that the static load point offsets, described above with regard to FIGS. 5 and 7, have been selected to optimize the flying attitude of the head assembly while the head assembly is flying over dz2.

Moving the head assembly further outward to dz3 results in application of the smaller negative current (−1) to the inner bending element, introducing additional roll moment in the direction of the LZ, and acting to counter the tendency of the increased linear velocity to increase the flying height of the head assembly.

When the head assembly is moved to dz4, small negative current (−1) is applied to both bending elements, resulting in more negative pitch than the static attitude of dz2, and acting again to counter the tendency of increased linear velocity to raise the flying height.

As the head is moved over dz5, the negative current applied to the outer bending element is maintained, and a larger negative current (−2) is applied to the inner bending element, introducing a still larger roll moment toward the LZ.

Finally, as the head is moved to the outermost data zone, dz6, the large negative current (−2) is applied to both bending elements, causing maximum negative pitch moment to be applied to the head assembly, and countering the high linear velocity's tendency to increase the flying height.

Thus, the present invention allows dynamic control of the pitch and roll attitude of the head assembly, and allows selected positive and negative roll moments to be exerted on the head assembly dependent upon the radial position of the head assembly over the disc.

While the example just described utilizes discrete levels of positive and negative currents applied to the bending elements, analog control of the currents applied to the bending elements can be utilized to further smooth the application of pitch and roll moments to the head assembly. Similarly, changes in the currents applied to the bending elements need not be directly related to data zone boundaries, nor is the number of different current levels limited to those shown in the graph of FIG. 19, nor is the interval between sequential current levels necessarily equal or linear. Again, it should be pointed out that the example described is only intended to show that varying amounts and polarities of control currents can be applied to the bending elements to control the pitch and roll attitudes of the head assembly—and thus the flying height of the head assembly—and that the shifting of the applied currents can be related to the radial position of the head assembly over the disc. Optimization of the applied currents in a particular disc drive, to provide a consistent flying height across the data recording area of the disc, will have to be based on the design characteristics of the disc drive, including, among other considerations, the rotational speed of the discs, the size of the head assemblies, the location of the point of zero head skew, and the static attitude selection of the head/head suspension assembly.

It should also be noted that either the bi-metal form of bending elements or the piezo-electric form of bending elements can be utilized only to impart positive pitch attitude and thus increase the flying height of the head assembly when the head assembly enters the landing zone, with the flying height over the data recording zone being left solely to the previously discussed prior art static flying attitude controls.

Figure 20:
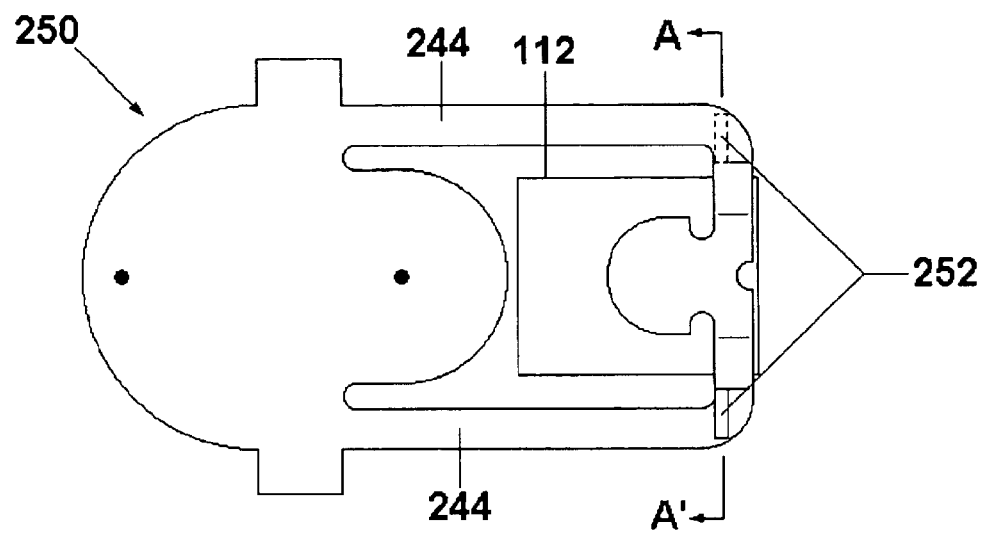
FIG. 20 is a plan view of a gimbal incorporating an alternative configuration of the control elements of the head suspension of the present invention.

FIG. 20 is a plan view of a gimbal 250, showing an alternative, or supplementary, location for bending elements 252. That is, the bending elements 252 can be the only bending elements incorporated in the gimbal 250, or can be included with the bending elements 242 of FIGS. 17 and 18 to provide additional control of pitch and roll attitudes of an attached head assembly 112.

As can be seen in FIG. 20, the bending elements 252 are laterally aligned at the distal ends of the gimbal beams 244, and can be positioned either on the top surface of the gimbal 250, as shown by solid lines at the lower portion of FIG. 20, or on the lower surface of the gimbal 250, as shown by dashed lines at the upper portion of the figure.

Figure 21:
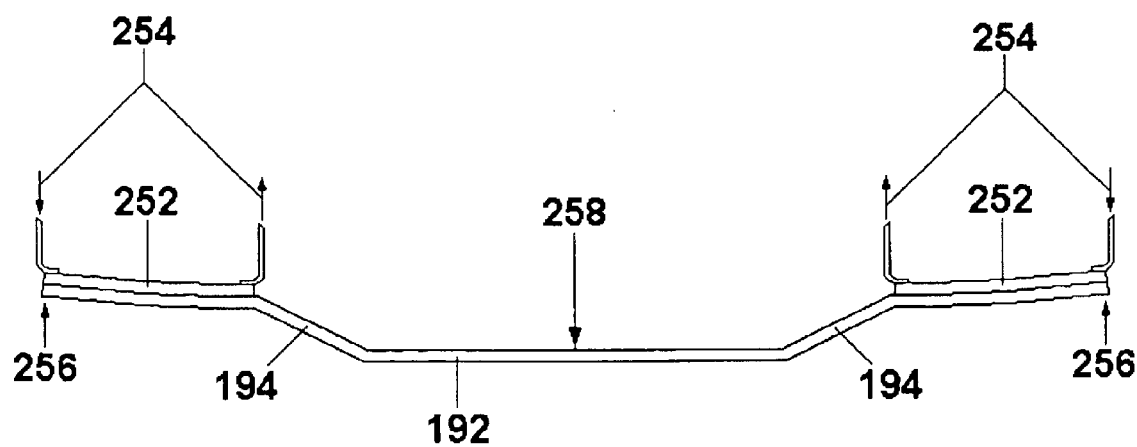
FIGS. 21 through 23 are detail end sectional views of the gimbal of FIG. 20, showing the effects of application of various combinations of control signals to the control elements of the head suspension of the present invention.
Figure 22:
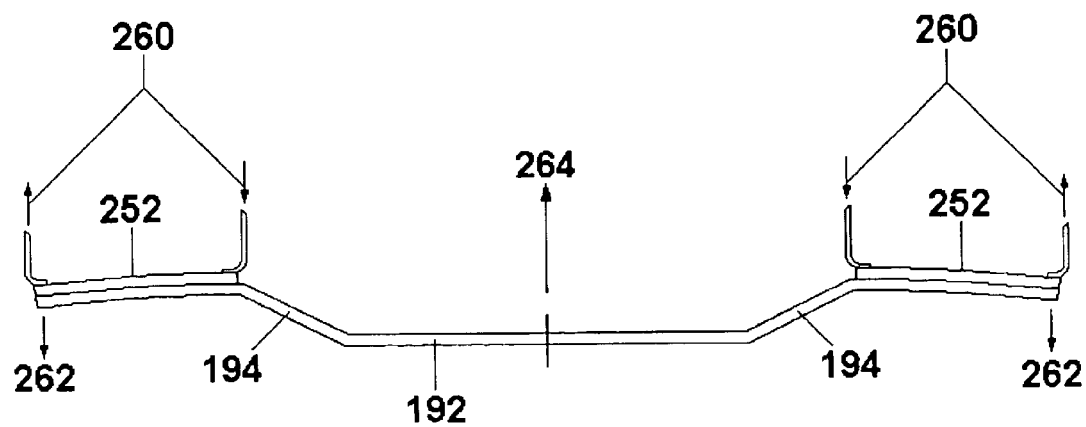
Figure 23:
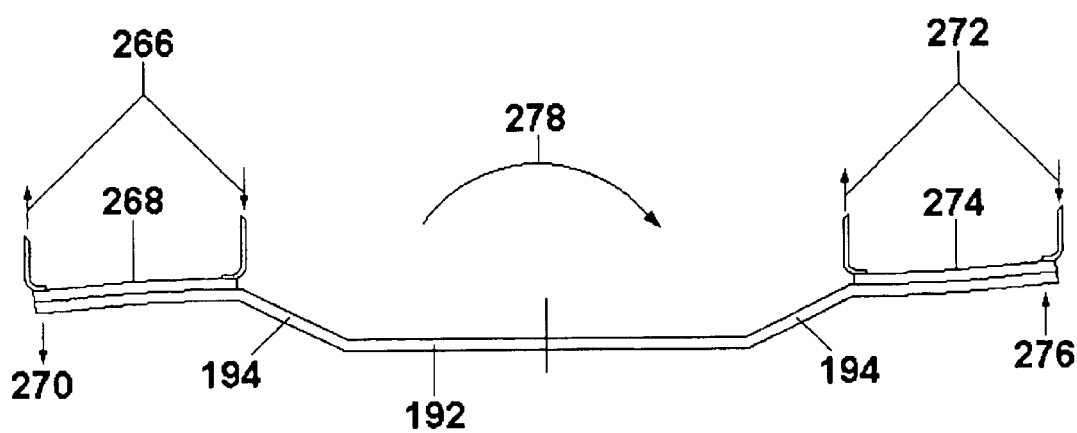

The effects of various embodiments of the bending elements 252 is illustrated in FIGS. 21 through 23, which are detail sectional views taken along line A–A' of FIG. 20.

FIGS. 21 through 23 also show the cross member 192 with bend regions 194, as previously noted with regard to FIG. 7. It will be understood by one of skill in the art that the operation of the present invention is not dependent on the presence of the bend regions 194 in the cross member 192. Similarly, the bending elements 252 in FIGS. 21 through 23 are all shown on the upper surface of the gimbal portion, but it should be understood, as previously noted, that the bending elements can also be located on the lower surface of the gimbal without exceeding the envisioned scope of the invention.

In FIG. 21, when current is applied to the bending elements 252 as shown by arrows 254, both of the bending elements 252 contract and cause the material of the gimbal to bend upward, that is in the direction of arrows 256. Such bending, in turn causes a downward force, as indicated by arrow 258, to be exerted on the cross member 192, which, in turn, passes the downward force 258 to the attached head assembly (not shown) near its trailing edge. Applying downward force near the trailing edge of the head assembly will result in a more positive pitch attitude, and an increased flying height. As will be apparent from previous discussion, the capability of dynamically increasing the flying height of the head assembly would be useful near the inner data recording zones where the effects of decreased linear velocity and head skew angle tend to cause the head assembly to fly lower, and would be particularly useful when moving the head assembly from the innermost data recording region into the relatively rough landing zone.

One of skill in the art will appreciate that the bending elements 252 can be either of the bi-metal type of FIGS. 11 through 13, where the material of the gimbal has a greater linear coefficient of thermal expansion than the material of the bending elements 252, or of the piezo-electric type of FIGS. 14 through 16, where the polarity of applied current is selected to cause the bending elements 252 to contract.

FIG. 22 is similar to FIG. 21, inasmuch as the bending elements 252 are once again shown on the upper surface of the gimbal. In FIG. 22, however, the application of current to the bending elements 252, as shown by arrows 260, causes the material of the gimbal to bend downward, in the direction of arrows 262, in the area of the bending elements 252. Such downward bending of the gimbal material has the effect of applying an upward force, as shown by arrow 264, to the gimbal, which is, in turn exerted on the trailing edge of an attached head assembly (not shown), resulting in increased negative pitch attitude, and a corresponding lowered flying height of the head assembly. One of skill in the art will appreciate that the capability of dynamically lowering the flying height would be particularly useful as the head assembly is moved outward over the disc to counter the tendency of increased linear velocity to increase the head assembly flying height.

Once again, the downward bending shown in FIG. 22 can be achieved using bi-metal bending elements 252, if the linear coefficient of thermal expansion of the bending elements is greater than that of the gimbal material, or by using piezo-electric bending elements 252 and selecting the polarity of the applied current to cause the piezo-electric bending elements to expand. Thus, the direction of the applied current shown by arrows 260 in FIG. 22 is opposite to that shown by arrows 254 in FIG. 21. It should be recalled, however, that reversing the direction of the applied current in bi-metal bending elements will not cause corresponding reversal of the bending direction, since, with bi-metal bending elements only the heating of the elements and their differing linear coefficients of thermal expansion are the controlling. factors, and the direction of the applied current has no controlling influence. Once again, the capability of bi-directional control of the bending direction is the reason that the piezo-electric embodiments of the present invention are currently preferred.

Turning finally to FIG. 23, in the operational example shown, current applied in the direction of arrows 266 to the left bending element 268 causes the bending element 268 to expand, bending the left side of the gimbal cross member 192 downward, in the direction of arrow 270, while current applied in the direction of arrows 272 to the right bending element 274 causes the bending element 274 to contract, bending the right side of the gimbal cross member 192 to bend upward, in the direction of arrow 276. This downward force on the left side of the gimbal and upward force on the right side of the gimbal will cause the attached head assembly (not shown) to roll to the right, in the direction shown by arrow 278. Once again, it should be appreciated by those of skill in the art that the capability of dynamically controlling head roll would be particularly useful in countering the tendency of the head assembly to vary in roll attitude as the head assembly is moved across the disc recording area.

It will also be evident that, if the configuration of FIG. 23 were implemented using bi-metal bending elements, the polarity of the applied current is not of significance, and further apparent that such an implementation would be capable of inducing increased roll in only a single direction, since it is only the selected differences in the linear coefficients of thermal expansion between the bending elements 268, 274 and the material of the gimbal which determines the direction of bending. This limitation is the principal reason that the presently preferred embodiment of the present invention utilizes piezo-electric bending elements.

If it is envisioned that the configuration of FIG. 23 is implemented using piezo-electric bending elements 268, 274, then it is apparent that the direction of bending is determined by the polarity of the currents applied to the bending elements 268, 274, and if the direction of current application shown by arrows 266 and 272 were reversed, the direction of bending and direction of forces applied to the gimbal—as shown by arrows 270 and 276—would also be reversed, causing the induced roll moment applied to the attached head assembly to be opposite in direction to that shown by arrow 278, i.e., induced roll to the left.

One of skill in the art will also realize that—using piezo-electric bending elements—extremely subtle control of induced roll moment can be achieved by applying current to only one of the bending elements, or applying currents of varying selected polarities and amplitudes to the two bending elements 268, 274, and that similar subtle control of both roll and pitch attitude of the head assembly can also be achieved with the bending element configuration of FIGS. 17 and 18. Indeed, if the present invention is implemented with piezo-electric bending elements, and the circuitry providing the current to the bending elements is sufficiently sophisticated, it can be readily seen that the previously discussed variations in head assembly flying height brought about by changes in the radial position of the head assembly over the disc can be substantially fully counteracted. Implementation of the present invention with piezo-electric bending elements will also result in more rapid variation in the applied control forces to the head suspension gimbal.

While the use of piezo-electric bending elements is the presently preferred embodiment of the present invention, such implementations require, as previously mentioned, the inclusion of relatively complex control logic for the applied currents. Implementations of the invention including bi-metal bending elements, while offering less overall flexibility than piezo-electric implementations, offer the advantage of less complex associated control circuitry. For instance, an implementation of the present invention that uses bi-metal bending elements only to increase the flying height of the head assemblies as they are moved into the landing zone offers a significant advantage over the prior art.

From the foregoing, it is apparent that the present invention is particularly well suited to provide the benefits set forth hereinabove as well as others inherent therein. While particular embodiments of the invention have been described herein, modifications to the embodiments that fall within the envisioned scope of the invention may suggest themselves to one of skill in the art who reads this disclosure. Therefore, the scope of the invention should be considered to be limited only by the following claims.

What is claimed is:

1. A head suspension comprising:
   a gimbal portion;
   a load portion to exert a load force on a head assembly relative to a load point and the gimbal portion supporting the head assembly to roll about a roll axis;
   a load portion to exert a load force on a ehad assembly relative to a load point and the gimbal portion supporting the head assembly to roll about a roll axis; and
   means for controlling roll attitude of the head assembly based upon a radial position of the head assembly in relation to a disc.

2. The head suspension of claim 1 wherein the means for controlling the roll attitude includes a plurality bending elements on opposed sides of the roll axis.

3. The head suspension of claim 2 wherein the plurality of bending elements are formed of a thermally expandable material forming a bi-metal structure having different coefficients of thermal expansion or a piezoelectric material.

4. The head suspension of claim 2 wherein the plurality of bending elements are independently energized relative to the radial position of the head assembly in relation to the disc.

5. A disc drive comprising:
   a rotating disc mounted for rotation in the disc drive;
   a head assembly;
   a head suspension including a load portion adapted to supply a load force to the head assembly at a load point and a gimbal portion to allow the head assembly to pitch and roll relative to the load point;
   an actuator coupled to the head suspension to move the head assembly relative to the disc; and
   means for dynamically controlling a roll attitude of the head assembly.

6. A head suspension comprising:
   a load portion to exert a load force on a head assembly relative to a load point;
   a gimbal portion having the head assembly coupled thereto to allow the head assembly to pitch and roll relative to the load point and the gimbal portion including opposed spaced gimbal beams on opposed sides of the load point; and
   a plurality of bending assemblies including a first bending assembly coupled to one of said gimbal beams and a second bending assembly coupled to another of said gimbal beams and the first and second bending assemblies being energizable to adjust pitch and roll attitudes of the head assembly.

7. The head suspension as claimed in claim 6, wherein the first bending assembly includes a first bending element energizable via a first electrical interface coupled to the first bending element and the second bending assembly includes a second bending element energizable via a second electrical interface coupled to the second bending element to independently energize the first and second bending elements to adjust the roll attitude of the head assembly.

8. The head suspension as claimed in claim 7, wherein the first and second bending elements include opposed leading and trailing ends and the first and second electrical interfaces include opposed leads coupled proximate to the opposed leading and trailing ends of the first and second bending elements.

9. The head suspension as claimed in claim 6, wherein:
   the first bending assembly includes a first bending element on the one of said gimbal beams and the second bending assembly includes a second bending element on the other of said gimbal beams and the first and second bending elements are formed of a thermally expandable material forming a bi-metal structure having different coefficients of thermal expansion.

10. The head suspension of claim 9 wherein the opposed spaced gimbal beams have a different coefficient of thermal expansion than the first and second bending elements to form the bi-metal structure having the different coefficients of thermal expansion.

11. The head suspension as claimed in claim 6 wherein:
   the plurality of bending assemblies include a bending element formed of a piezoelectric material.

12. The head suspension as claimed in claim 6, wherein:
   the first bending assembly includes a first bending element on the one of said gimbal beams and the second bending assembly includes a second bending element on the other of said gimbal beams and the first and second bending elements have an elongated length extending along an elongated length portion of the gimbal beams.

13. The head suspension of claim 6 wherein the first and second bending assemblies are energized based upon a radial position of the head assembly relative to a disc.

14. A head suspension comprising:
   a suspension portion to exert a load force on a head assembly relative to a load point;
   a gimbal portion having the head assembly coupled thereto to allow a leading edge of the head assembly to pitch about a pitch axis and opposed sides of the head assembly to roll about a roll axis relative to the load point; and
   the gimbal portion further including a plurality of bending elements including at least one bending element on a first side of the roll axis and at least one bending element on a second opposed side of the roll axis actuatable to adjust a roll attitude of the head assembly relative to the roll axis.

15. The head suspension as claimed in claim 14, wherein:
   the plurality of bending elements are formed of a thermally expandable material forming a bi-metal structure having different coefficients of thermal expansion or a piezoelectric material.

16. The head suspension as claimed in claim 14, wherein:
   the gimbal portion further comprises a pair of longitudinally extending gimbal beams and a connecting cross member between distal ends of the pair of gimbal beams; and
   the plurality of bending elements are mounted on the connecting cross member.

17. The head suspension as claimed in claim 14, wherein:
   the gimbal portion further comprises a pair of longitudinally extending gimbal beams; and
   the plurality of bending elements are mounted on the pair of gimbal beams.

18. The head suspension as claimed in claim 14, wherein:
a first electrical interface is coupled to the at least one bending element on the first side of the roll axis and a second electrical interface is coupled to the at least one bending element on the second opposed side of the roll axis to independently energize the first and second bending elements to adjust the roll attitude of the head assembly.

* * * * *